United States Patent [19]

Betzig et al.

[11] Patent Number: 5,105,305
[45] Date of Patent: Apr. 14, 1992

[54] NEAR-FIELD SCANNING OPTICAL MICROSCOPE USING A FLUORESCENT PROBE

[75] Inventors: Robert E. Betzig, Chatham; Jay K. Trautman, Bedminster, both of N.J.

[73] Assignee: AT&T Bell Laboratories, Murray Hill, N.J.

[21] Appl. No.: 639,629

[22] Filed: Jan. 10, 1991

[51] Int. Cl.⁵ .............................................. G02B 21/06
[52] U.S. Cl. .............................. 359/368; 250/227.14; 250/458.1; 385/12; 385/125
[58] Field of Search ............... 350/96.10, 96.15, 96.18, 350/96.24–96.26, 96.29–96.34; 128/634; 606/2, 15, 16; 250/227.14, 227.18, 458.1

[56] References Cited

U.S. PATENT DOCUMENTS

| | | | |
|---|---|---|---|
| 4,577,109 | 3/1986 | Hirschfeld | 250/461.1 |
| 4,712,865 | 12/1987 | Hsu et al. | 350/96.29 |
| 4,746,179 | 5/1988 | Dahne et al. | 350/96.10 |
| 4,917,462 | 4/1990 | Lewis et al. | 350/319 |
| 4,919,891 | 4/1990 | Yafuso et al. | 350/96.30 X |
| 4,974,929 | 12/1990 | Curry | 350/96.29 X |
| 4,999,306 | 3/1991 | Yafuso et al. | 350/96.30 X |
| 5,001,051 | 3/1991 | Miller et al. | 350/96.18 X |

*Primary Examiner*—John D. Lee
*Attorney, Agent, or Firm*—M. I. Finston; E. E. Pacher

[57] ABSTRACT

A novel probe, useful for near-field optical scanning microscopy, is provided. The probe has a fine tip which includes fluorescent material. In one embodiment, the invention is an apparatus which includes such a probe, means for exciting and detecting fluorescence in the probe tip, means for positioning the probe tip near the surface of a sample, and means for displacing the probe tip relative to the sample. In a second embodiment, the invention is a manufacturing method in which the novel probe is used to measure a characteristic dimension of a patterned workpiece.

11 Claims, 4 Drawing Sheets

NEAR-FIELD SCANNING OPTICAL MICROSCOPE USING A FLUORESCENT PROBE

BACKGROUND OF THE INVENTION

This invention relates generally to the field of optical microscopy, and more particularly to near-field scanning optical microscopy for high-resolution imaging.

Microscopes employing conventional optical imaging systems cannot resolve features substantially smaller than about one-half an optical wavelength, because of diffractive effects. However, near-field scanning optical microscopy (NSOM) can be employed to achieve finer resolution in optical imaging. In NSOM, an aperture having a diameter that is smaller than an optical wavelength is positioned in close proximity (i.e., within less than one wavelength) to the surface of a specimen and scanned over the surface. Light may be either emitted or collected by such an aperture. The aperture is defined in the end of a probe. Mechanical or piezoelectric means are provided for moving the probe relative to the sample. Light that has interacted with the sample is collected and detected by, e.g., a photomultiplier tube. The strength of the detected light signal is typically stored, in the form of digital data, as a function of the probe position relative to the sample. The stored data can be displayed on, e.g., a cathode-ray tube as an image of the scanned surface.

One approach to the design of NSOM probes has been described in U.S. Pat. No. 4,917,462, issued to A. Lewis, et al. on Apr. 17, 1990. According to that approach, the probe is a highly tapered, glass pipette. The optical aperture is defined at the narrow end of the pipette, where the capillary bore forms an orifice. The outer surface of the pipette is coated with metal, typically aluminum, in order to increase the opacity of the glass wall. The aperture is defined by metallizing the annular region at the very end of the pipette, surrounding the orifice. The resulting tip aperture is readily made less than 1000 Å in diameter, or even smaller.

The pipette behaves approximately like a classical metallic waveguide. Light is transmitted through the pipette in a propagating mode or combination of modes. A cutoff diameter is associated with each such mode. Generally, the outer diameter of the glass wall of the pipette is everywhere greater than the cutoff diameter of the lowest desired mode. The cutoff threshold of the lowest mode is reached only at the thin metallized region at the tip of the pipette.

A second, aperture-based approach to NSOM probes has been described in U.S. patent application Ser. No. 615,537, filed on Nov. 19, 1990. According to that approach, the probe is made from a tapered, single-mode optical fiber having a flat end portion. At least a terminal portion of the tapered fiber is coated with metal on the outer walls. Optionally, the end flat is also overcoated with metal. The metal layer overlying the end flat is formed as an annulus, the bare portion within the annulus defining the optical aperture of the probe. Analogously to the pipette probe, the metallized terminal portion of the fiber probe behaves like a metallic waveguide. The diameter of the fiber falls to the cutoff diameter of the lowest mode of interest at or near the end flat.

Although useful, the aperture-based probes described above suffer several disadvantages.

For example, it has been noted that there are cutoff diameters associated with the metallic waveguiding properties of the probes. If apertures are made substantially smaller than the cutoff diameters for the modes of interest, the attainable signal is substantially decreased. As a consequence, there are practical limits on how small the tip diameter can be made while still providing a useful signal. Furthermore, the thickness of the metal layer contributes to the overall diameter of the probe tip. Thus, both the tradeoff between aperture size and signal strength, and the thickness of the metal layer, impose limits on the smallest practical tip size.

Signal transmission through small apertures is fraught with other difficulties in addition to the problem of attenuation in a below-cutoff waveguide. For example, the maximum signal that can be collected by an idealized aperture of diameter D in an infinitesimally thin screen is theoretically proportional to $D^6$. Thus, it is clear that the signal drops rapidly in strength as the aperture is reduced in size.

Yet another disadvantage is that the ultimate achievable resolution is limited by the finite electrical conductivity of any metal coating. That is, if the metal coating were a perfect conductor, the guided electromagnetic field would not penetrate into the metal. However, because any actual metal used for coating the fiber has some electrical resistivity, and therefore a finite conductivity, it is inevitable that the electromagnetic field will extend some distance into the metal. This is true, in particular, at the aperture. As a consequence, the effective aperture (for purposes of image resolution) is somewhat larger than the metal-free region at the end of the fiber. Instead, the effective aperture extends into the surrounding metallized region. Because of this, it is difficult, as a practical matter, to resolve features substantially smaller than about 100 Å in extent, even with the finest aperture-based probes.

Practitioners in the field have hitherto been unable to circumvent the limitations discussed above. As one consequence, efforts to make extremely high-resolution probes, e.g., probes capable of resolving features smaller than about 100 Å while providing signal-to-noise ratios large enough for practical imaging, have been frustrated.

SUMMARY OF THE INVENTION

We have invented an NSOM probe that circumvents at least some of the problems inherent in aperture-based probes. The inventive probe incorporates fluorescent means in the probe tip. The fluorescent means are relatively small in spatial extent, and, in fact, are readily made smaller than the cutoff diameters typical of aperture-based probes. The fluorescent means are typically, although not necessarily, excited by electromagnetic radiation (here referred to as "excitation light"). Because the light emitted during fluorescence (here referred to as "fluorescent light") generally has a different wavelength than the excitation light, a ready means is provided for eliminating background optical signals. That is, spectral cutoff filters are readily used to distinguish the direct and scattered light emitted by the excitation source from fluorescent light associated with the probe tip. Significantly, the maximum signal intensity that can be emitted or collected by such fluorescent means depends relatively weakly on the diameter of the fluorescent means. (The theoretical dependence may be approximated by $D^n$, where n is close to 2, rather than 6 as in the aperture-dependent case.) As a consequence, the probe tip can be made quite small without suffering a severe penalty in decreased signal strength. In use, the probe tip is positioned adjacent a sample surface. The distance between the probe tip and the surface should be less than about five times the wavelength of the fluorescent light, and in many cases is less than one wavelength.

In one aspect, the invention involves apparatus comprising: a probe, the probe having a tip capable of emitting light at least at a given wavelength; means for detecting at least a portion of the light emitted by the probe tip; means for positioning the probe adjacent a sample such that the distance between the probe tip and the sample is smaller than five times the given wavelength; and means for displacing the probe tip relative to the sample, characterized in that the probe tip comprises fluorescent material capable of emitting light at least at the given wavelength when the fluorescent material is appropriately excited; and the apparatus further comprises means for exciting the fluorescent material.

In a second aspect, the invention involves a method for manufacturing an article, comprising the steps of: providing a multiplicity of semiconductor wafers, each wafer having a surface to be patterned; setting at least one process parameter; processing at least a first wafer according to the process parameter such that a pattern is formed on the surface of the wafer, the pattern having a characteristic dimension; measuring the characteristic dimension in at least one of the multiplicity of semiconductor wafers; comparing the characteristic dimension to a predetermined range of values; if the characteristic dimension lies outside the predetermined range of values, changing the process parameter to bring the characteristic dimension within the predetermined range of values; after changing or not changing the process parameter, depending on the outcome of the comparing step, processing at least a second wafer according to the process parameter; and performing, on at least the second wafer, at least one additional step toward completion of the article, characterized in that the measuring step comprises: providing a probe having a tip, the probe tip comprising fluorescent material capable of emitting light at least at a given wavelenght when the fluorescent material is appropriately excited; positioning the probe relative to the wafer such that the distance between the probe tip and at least a portion of the pattern is smaller than the given wavelength; displacing the probe tip relative to the wafer; during the displacing step, exciting fluorescence in the probe tip; and detecting fluorescent light emitted by the probe tip.

DETAILED DESCRIPTION

The invention involves an optical system. In one embodiment, depicted schematically in FIG. 1, such an optical system exemplarily includes a light source 10, a probe 20, and displacement means 30 for displacing the probe relative to an object 40. The object is exemplarily disposed on a stage 50, such that a portion of the surface of the object lies adjacent the probe tip 60. The probe tip 60 comprises a fluorescent portion 65 that is capable of emitting light when it is impinged by light from light source 10. Generally, the fluorescent light emitted by portion 65 has a different wavelength than the excitation light emitted by source 10. (It should be understood that "light" in this context comprises electromagnetic radiation in the infrared, visible, and ultraviolet regions of the spectrum, and that the excitation light may also lie in the x-ray region of the spectrum.)

The exemplary optical system further comprises means for optically coupling light source 10 to probe 20. In the example illustrated in FIG. 1, the optical coupling is provided by a single-mode optical fiber 70 extending between light source 10 and probe 20. (Fiber 70 may, in fact, be integral with probe 20 if probe 20 is a tapered-fiber type probe, to be described below.) Light source 10 is exemplarily a laser. Light from source 10 is readily injected into the optical fiber by way, e.g., of of a single-mode coupler 80, which includes a microscope objective 90 and a fiber positioner 100. The displacement means 30 may, for example, be a piezoelectric tube adapted for moving the probe vertically as well as in two orthogonal lateral dimensions. Alternatively, the displacement means may be mechanical or piezoelectric means for moving the stage rather than the probe, or some combination of stage-displacement and probe-displacement means.

Figure 1:
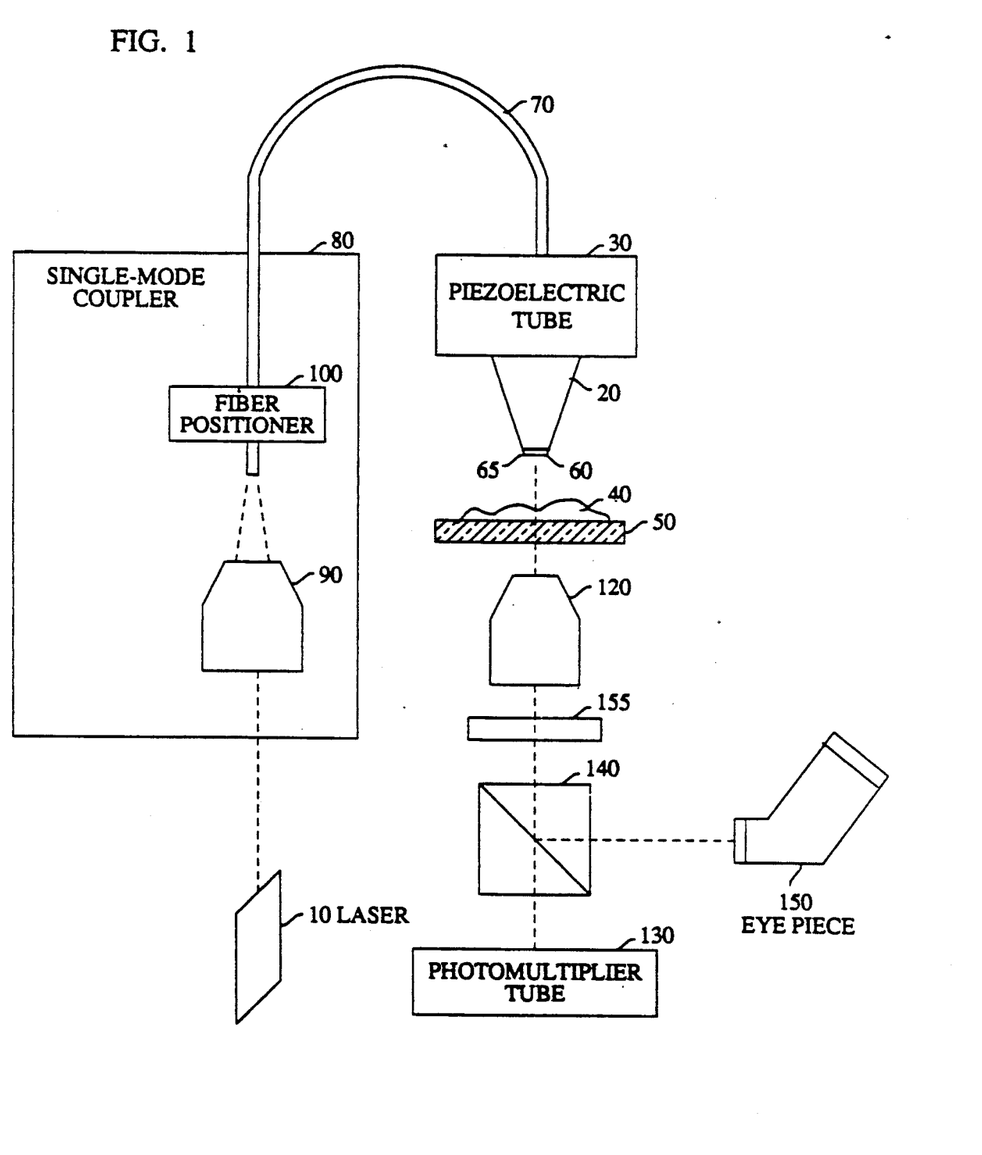
FIG. 1 is a schematic drawing of an optical system according to one aspect of the invention.

The fluorescent light emitted by portion 65 may be employed for imaging in several different ways. In a so-called transmission mode, as illustrated in FIG. 1, the fluorescent light is transmitted through the sample, collected, e.g., by microscope objective 120, and detected by, e.g., photomultiplier tube 130. Beamsplitter 140 is readily used to direct a portion of the transmitted light into eyepiece 150 for visual alignment. Optical cutoff filter 155 is readily used to block the (generally, shorter wavelength) excitation light emitted by source 10 from entering the eyepiece and photomultiplier tube.

Appropriate mounting systems for the probe and the sample are well known in the art and need not be described here in detail. Exemplary mounting systems are described in U.S. Pat. No. 4,917,462, issued to A. Lewis, et al. on Apr. 17, 1990. Details of the optical coupling between a light source and a single-mode optical fiber are described in U.S. patent application Ser. No. 615,537, cited above.

A number of variations on the optical arrangement for transmission-mode imaging depicted in FIG. 1 will be readily apparent to the skilled practitioner. For example, the excitation light may be transmitted from source 10 to portion 65 through the air instead of through light-guiding means. The excitation light may be transmitted through the air directly from source 10 to portion 65, or, e.g., it may first be directed into beamsplitter 140, through objective 120, and through the sample before impinging on portion 65. In yet another variation, light-guiding means such as fiber 70 are readily employed, not to convey excitation light to portion 65, but instead to convey fluorescent light to detector 130. In such a variation, the excitation light is impinged on the bottom of the sample (as viewed in FIG. 1) by objective 120, and the excitation light impinges on portion 65 only after passing through the sample.

Figure 2:
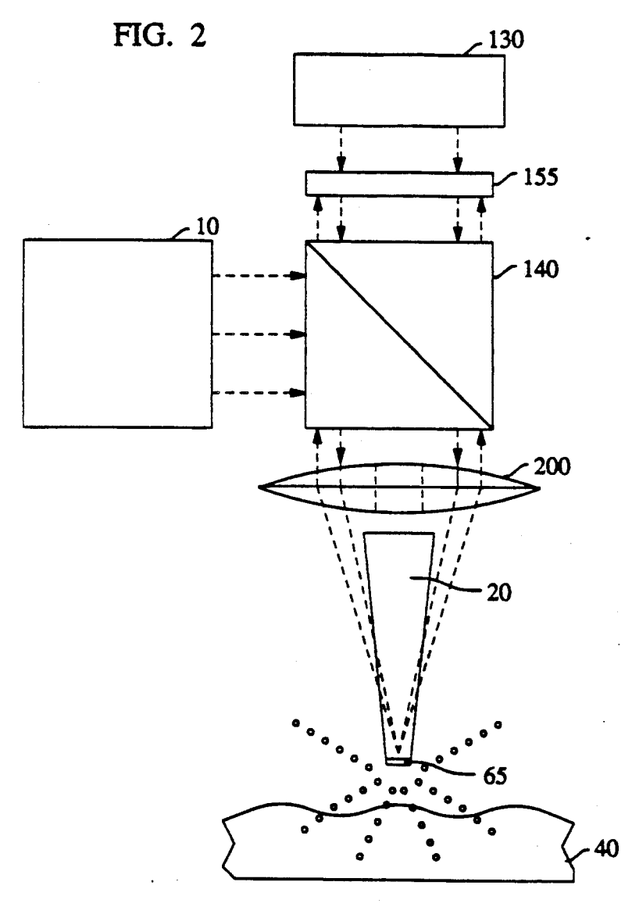
FIG. 2 is a schematic drawing of an alternative optical arrangement.

As noted, the transmission mode is only one of several imaging modes. One alternative mode is the reflection mode. An exemplary optical arrangement for reflection-mode imaging is depicted in FIG. 2. As shown in FIG. 2, excitation light from source 10 is directed onto portion 65 via beamsplitter 140 and annular lens 200. (Lens 200 is optionally made into an annulus in order to permit the back portion of the probe, or an optical fiber extending from the back portion of the probe, to extend along the optical axis up to or even beyond the axial location of lens 200.) Fluorescent light, in turn, is collected by annular lens 200 and directed into detector 130 via beamsplitter 140 and cutoff filter 155. In at least some instances, it may be desirable to block excitation light from impinging directly on probe 20. That is, probe 20 may comprise glass which is capable of fluorescing when impinged by the excitation light. Such impingement is undesirable because the resulting fluorescence may increase the background level detected by detector 130 and therefore decrease the signal-to-noise ratio. It will be readily apparent to the skilled practitioner that in an alternative arrangement, either the excitation light incident on portion 65, or fluorescent light collected from portion 65, or even both excitation and fluorescent light, is readily transmitted through probe 20 to the source or detector, as appropriate. In particular, a tapered fiber probe provides very efficient means for transmitting light to or from portion 65.

Several effects are capable of modulating the fluorescent light intensity detected at detector 130. One such effect is perturbation of the optical-frequency electromagnetic field at portion 65 due to the proximity of the sample surface. A second effect is quenching of the fluorescence in portion 65. For example, dipole-dipole interactions, which extend, typically, over distances up to about 100 Å, are capable of deactivating optically excited species in portion 65 and thus decreasing the amount of fluorescent light. The degree to which a given fluorescent species is quenched depends on the composition of the nearby material with which it is interacting. As a consequence, fluorescence quenching provides a mechanism for imaging not only surface topography (which affects propinquity of the surface to the probe tip), but also surface composition.

It should be noted in this regard that specialized dyes can be provided, that are sensitive to special properties of the sample surface. For example, dyes will be readily apparent to the skilled practitioner that are sensitive to the local concentration of hydrogen ions on the sample surface, thus providing pH-sensitive imaging. Similarly, dyes will be apparent whose fluorescence is quenched by the presence of other specific ions. Other dyes will be apparent, having fluorescence that is sensitive to local electric fields. Probes incorporating such dyes may, for example, be capable of mapping electrical potentials on the sample surface. Additionally, fluorescent species may be provided having spectrally sharp emission that exhibits a measurable Stark shift in the presence of electric fields. Probes incorporating such species are also capable of mapping electrical potentials on a sample surface.

Probe 20 is exemplarily a tapered glass probe, for example a tapered pipette or a tapered, single-mode optical fiber. Details of preparing appropriate pipette probes are described in U.S. Pat. No. 4,917,462, cited above. Briefly, the pipette is formed by heating and drawing a glass tube to taper the pipette and then further heating and drawing it until it breaks. By selecting various wall thicknesses of the glass tube, inner tip diameters of from less than 1000 Å to 5000 Å, with outer tip diameters of 5000–7500 Å are readily and reproducibly generated. If the probe is to function as an aperture-based probe, a metal coating is evaporated onto the outer surface of the pipette to increase the opacity of the glass wall. However, such a metal coating is generally undersirable for purposes of the inventive probe because it increases the outer diameter of the probe and may cause scattering of excitation light. Useful pipettes are readily formed using, for example, a commercially available, gravity-driven pipette puller with induction heating.

Details of preparing appropriate tapered fiber probes are described in U.S. patent application Ser. No. 615,537, cited above. Briefly, a single-mode optical fiber is heated and drawn until it breaks, analogously with the pipette described above. The tapering is readily achieved in, for example, a commerically available, gravity-driven pipette puller. Heating is advantageously provided by a laser. For purposes of the inventive probe, metallization of the fiber is generally undesirable for the reasons described above in connection with pipette probes. However, if the fluorescent portion is to be formed by ion implantation of the fiber, then after drawing, at least a portion of the tapered fiber is desirably coated with a metal such as gold to serve as an implantation mask. The mask is generally stripped off after ion implantation has been completed.

Significantly, after drawing, the end portion of the fiber comprises a taper that terminates in an end flat. If ion implantation is performed, the ions are implanted in the end flat.

Figure 3:
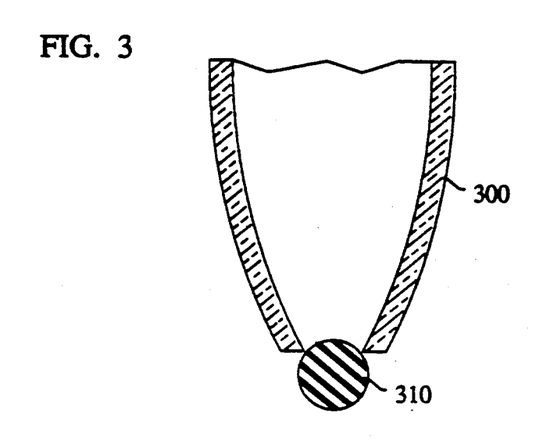
FIG. 3 is a schematic representation of a tapered pipette probe with an adherent particle, according to one aspect of the invention.

With reference to FIG. 3, the probe is made, in one currently preferred embodiment, from a tapered pipette 300. The fluorescent portion comprises one or more fluorescent particles that adhere to the tip of the pipette. For example, a single, fluorescent, spherical particle 310 is readily provided having a diameter slightly greater than the diameter of the aperture in the tip of the pipette. Such a particle may be placed partially within the aperture such that it is centered within the aperture and adheres to a rim-like portion of the inner wall of the pipette at or near the aperture. As noted, pipettes are readily fabricated having aperture diameters of 200–5000 Å. Spherical latex balls having diameters of 200–5000 Å are readily made, and are available commercially from, e.g., the Interfacial Dynamics company of Portland, Oreg. Such latex balls are readily impregnated with fluorescent dyes. Impregnation of latex balls with fluorescent dye is performed commercially by, for example, the Molecular Probes company of Eugene, Oreg.

Even smaller fluorescent particles, as small as about 40 Å in diameter, can be made from fluorescent semiconductor compounds such as cadmium sulfide or other II–VI compounds. There are several ways to use fluorescent particles that are smaller in diameter than the aperture. For example, a latex ball, which may itself be non-fluorescent, is readily situated in the aperture as described. Fluorescence is provided by one or more small particles that are affixed to the surface of the latex ball distal the aperture. Alternatively, one or more small particles may be affixed directly to the glass pipette tip near the aperture.

Figure 4:
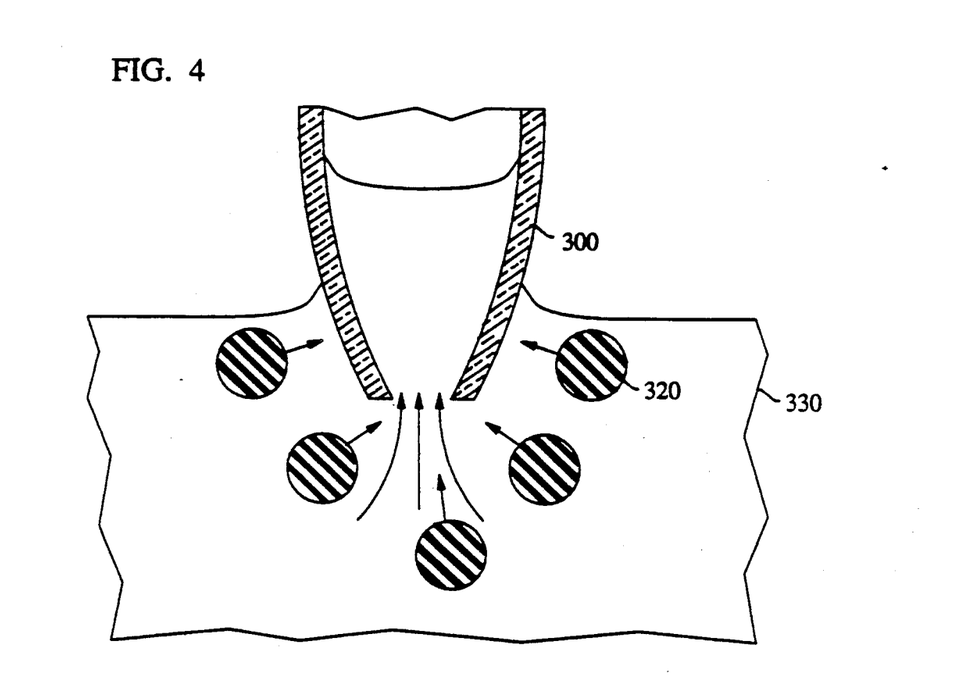
FIG. 4 is a schematic drawing illustrating one method for adhering particles to the probe of FIG. 3.

With reference to FIG. 4, in a currently preferred procedure, capillary action is used to affix a fluorescent-dye-impregnated latex ball 320 within the aperture of a pipette probe 300. The ball diameter is slightly larger than the aperture. For example, a batch of balls is provided having diameters of about 680 Å, and a corresponding pipette is provided having an aperture diameter of 500 Å. The balls are manufactured such that they include chemical surface groups, such as amidine surface groups, that promote adhesion to the surface of the glass. The latex balls are suspended in distilled water 330. The concentration of the suspension is preferably about $2.5 \times 10^{-3}$ wt. % latex. In order for the process to have a relatively high yield of acceptable probes, the balls should be relatively uniform in size, desirably distributed in size with a variance of not more than about 30%, and still more desirably less than about 10%. The pipette is dipped into the suspension just until the pipette tip breaks the meniscus of the suspension, and then the tip is withdrawn. If the dip is successful, water is drawn up into the pipette by capillary action. As a consequence of the influx of water, latex balls are carried toward the pipette tip. The influx is stopped when an entrained latex ball lodges in the aperture.

Additionally latex balls may adhere to the glass outside of the aperture region. Significantly, the ball that adheres to a rim-like region will be held more tightly than balls that cling by point-contact to the outside of the aperture region. As a consequence, balls adhering to the outer sides of the pipette are readily removed by dipping the pipette tip in an ultrasonically agitated distilled water bath. A few seconds is generally enough to remove undesired, adherent balls.

It should be noted in this regard that the influx of water into the pipette is facilitated if the pipette is provided with an omega dot. (An "omega dot" is a glass fiber fused to the inner surface of the pipette and extending substantially parallel to the longitudinal axis of the pipette. Such a feature is well-known to facilitate capillary action. Glass tubes for forming pipettes that include omega dots are commercially available, e.g., from Sutter Instruments.)

The water that enters the pipette as a result of capillary action will eventually evaporate. If desired, the water can be replaced by injecting a liquid into the pipette through the end opposite the tip. The latex sphere will continue to adhere even after all the water has evaporated. However, the continued presence of an appropriate liquid in the pipette might prolong the useful lifetimes of some fluorescent dyes, for example by excluding oxygen.

Figure 5:
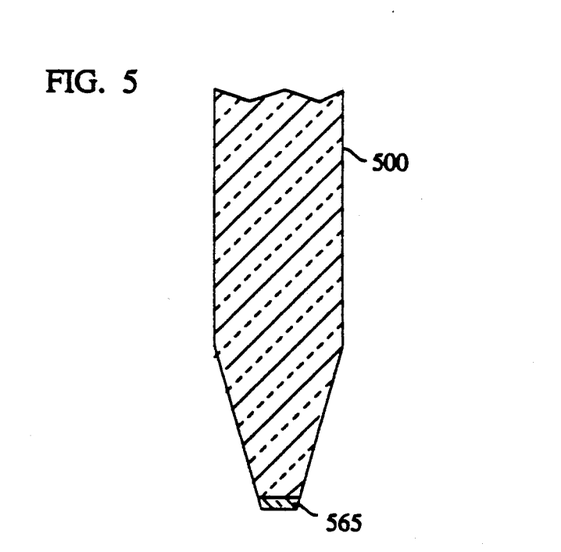
FIG. 5 is a schematic drawing of a tapered fiber probe according to an alternative embodiment of the invention.

With reference to FIG. 5, in a second, currently preferred embodiment, the probe is made from a tapered, single-mode optical fiber 500 instead of a pipette. A tapered fiber probe is especially desirable because it is capable of channeling light to or from the fluorescent portion with high efficiency. Fluorescent portion 565 is created by ion implanting the end flat of the fiber. As noted, the outer fiber surface along a terminal portion is first coated with an appropriate metal, such as gold, to serve as an implantation mask. The mask is stripped off after implantation.

Thus in this embodiment, portion 565 is integral with the fiber. The diameter of an end flat for this purpose desirably ranges from about 100 Å or even less to about 1000 Å or more. Implanting a region substantially smaller than about 100 Å will result in a correspondingly small signal. Implanting a region substantially larger than 1000 Å will result in correspondingly coarse resolution. Various ions are useful for creating a fluorescent region. These include, but are not limited to, ions of cerium, terbium, and europium. The implanted region is desirably as close to the surface of the end flat as possible, in order to concentrate the ions within the near field of the sample. (However, the ions should not be concentrated within so shallow a region that substantial concentration quenching takes place.) A useful range of implantation densities is from about $10^{14}$ cm$^{-2}$ to about $10^{16}$ cm$^{-2}$. A substantially smaller density is undesirable because a correspondingly small signal will be obtained. A substantially larger density is undesirable because concentration quenching may take place.

Instead of forming a fluorescent fiber portion by ion implantation, a tapered fiber, can, alternatively, be provided with an attached, fluorescent particle. For example, a fiber may be provided, having a borehole formed in the end flat and extending substantially parallel to the longitudinal axis of the fiber. Appropriate methods for forming such a borehole will be readily apparent to the skilled practitioner. For example, a fiber having a borehole is readily provided by initially drawing the fiber from a special preform. The preform includes a rod of glass that is relatively rapidly etched, embedded in a collapsed tube of glass that is relatively resistant to etching. After the fiber is heated, drawn, and broken off to form a probe, the end of the fiber is exposed to an appropriate etchant. After a borehole is formed, the fiber is dipped into a suspension, e.g., of latex balls, in analogy with the treatment of a pipette probe described above.

It should be pointed out that the fluorescent portion is not necessarily excited by electromagnetic radiation. For example, the fluorescent portion may be an LED or other electroluminescent light source. In such a case, excitation is provided by applying an appropriate electric field or electric current to the fluorescent portion. A pair of electrical conductors extending to a probe tip of suitably small dimensions is readily provided, for example, by the method disclosed in U.S. Pat. No. 4,747,698, issued to H. K. Wickramasinghe, et al. on May 31, 1988. As disclosed therein, electropolishing techniques are used to prepare a tungsten probe having a tip diameter of about 100 Å. The tungsten is overcoated first with a dielectric layer, and then with a conductive layer. In the cited patent, the tungsten core and the conductive layer form a thermocouple junction. However, the conductive layer is readily applied (e.g. by evaporative deposition from the side) in such a way that it does not join the tungsten core. A two-terminal electroluminescent device can then be mounted on the probe tip such that one terminal contacts the tungsten core and the other terminal contacts the conductive layer.

Figure 6:
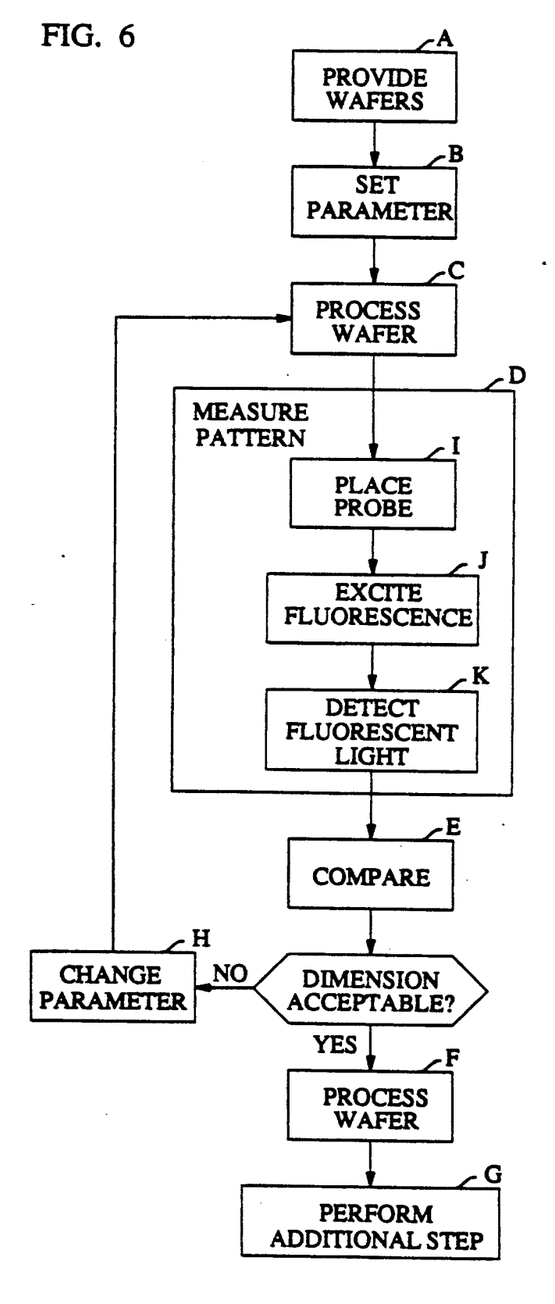
FIG. 6 is a flowchart illustrating the steps in a manufacturing process according to one aspect of the invention.

The inventive apparatus is useful, inter alia, for inspecting processed semiconductor wafers on a manufacturing line. Accordingly, the invention, in one aspect, is a method for manufacturing an article, using an optical system which includes the inventive probe. Such an inventive method comprises the steps outlined below, and shown in the block diagram of FIG. 6. With reference to FIG. 6, a multiplicity of semiconductor wafers is first provided, each wafer having a surface to be patterned at one or more stages of the manufacturing process (Step A of FIG. 6). The patterns that are to be formed have characteristic dimensions, sometimes referred to as "line widths," that must generally be kept within close tolerances. The inventive apparatus is readily used for measuring line widths (D), such as the width of metallic conductors on a wafer, or the length of gates formed in metal-oxide-semiconductor (MOS) structures on a wafer. After one or more process parameters, exemplarily lithographic exposure times or etching times, are initially set (B), one or more initial wafers are processed according to those parameters, such that patterns are formed on the wafer surfaces (C). The corresponding line widths are readily measured using the inventive apparatus, and are then readily compared (E) with predetermined, desired ranges of values. Depending upon the results of such comparison, the process parameters are then readily adjusted (H) to bring the measured dimensions within the desired tolerances, and further wafers are processed (F). Additional steps (G) toward completion of a manufactured article are then performed. The measuring step includes providing a probe having a tip, the probe tip comprising fluorescent material capable of emitting light at least at a given wavelength when the fluorescent material is appropriately excited, positioning the probe relative to the wafer such that the distance between the probe tip and at least a portion of the pattern is smaller than the given wavelength (I), displacing the probe tip relative to the wafer, during the displacing step, exciting fluorescence in the probe tip (J), and detecting fluorescent light emitted by the probe tip (K).

EXAMPLE I

An aluminosilicate glass pipette was obtained, having outer and inner diameters of 1 mm and 0.58 mm, respectively. The pipette included an omega dot to facilitate capillary action. The pipette was mounted in a Sutter Instruments Mod. P-87 micropipette puller, and pulled under the control of an eight-line program. Each of the first seven lines of the program had the following entries: cooling-air pressure, 400; heat, 820; hard pull, 0; velocity, 10; time, 255. The eighth line had the following respective entries: 400; 840; 50; 8; 50. The resulting pipette had, at the tip, an outer diameter of about 1000 Å or slightly less, and an inner diameter of about 500 Å. Latex balls were obtained, having diameters of about 680 Å. As obtained, the balls were impregnated with fluorescent dye and included amidine surface groups to promote adhesion to glass. The dyes came from the commercial supplier in an aqueous suspension, which was diluted with distilled water to $2.5 \times 10^{-3}$ wt. % latex. While under visual observation in a stereoscopic microscope, a pipette was lowered into the latex ball suspension until the pipette tip barely broke the meniscus at the surface of the suspension. As a result of this step, a latex ball lodged in the aperture of the pipette, and additional balls attached to the outer wall of the pipette. The pipette tip was then withdrawn and subjected to ultrasonic agitation in a container of distilled water. The agitation removed the excess latex balls. The pipette tip was then visually inspected under a microscope with excitation light impinging on the latex ball in the aperture such that fluorescent light visibly emanated from the ball. The pipette was then mounted in a scanning device and illuminated with laser light at a wavelength of 488 nm. As a result of the laser illumination, the ball fluoresced at a peak wavelength lying in the range 530–550 nm.

The pipette was used to scan, in a transmission-mode geometry, a sample consisting of an aluminum grating on a glass substrate. The illumination geometry that was used is conveniently described with reference to FIG. 1. As viewed in the figure, the probe was positioned above the sample, and an objective (objective 20 of the figure) was positioned below the sample. The same objective was used both to concentrate excitation light on the probe tip, and to collect fluorescent light from the probe tip. Thus, both excitation and fluorescent light passed through the sample. Features smaller than 0.25 $\mu$m were resolved by this means.

EXAMPLE II

A single-mode optical fiber was drawn in a Sutter Instruments Mod. P-87 micropipette puller to make a probe. During drawing of the fiber, the fiber was heated with a continuous, non-focused 25-watt beam from a carbon dioxide laser. The control settings for the pipette puller (in a one-line program) were: pull, 75; velocity, 4; time, 1. After drawing, a terminal portion of the fiber was evaporatively coated with metal to serve as an implantation shield for subsequent ion implantation. First, 50 Å–100 Å of chromium was deposited, and over that, about 750 Å of gold was deposited. Ions were implanted head-on toward the end flat of the tapered fiber. Exemplary ions used were ions of cerium, europium, and terbium. In each case, the implantation energy was about 100 keV, and the implantation density was from about $10^{14}$ cm$^{-2}$ to about $10^{16}$ cm$^{-2}$. After implantation, the gold was stripped in a potassium iodide etchant. The chromium was then stripped in a ceric ammonium nitrate etchant. Remaining traces of chromium were volatilized by flash heating in a roughly 10-watt carbon dioxide laser beam. The fiber was then mounted in a scanning device.

We claim:

1. In a near-field scanning optical microscope, apparatus comprising:
    a probe, the probe having a tip capable of emitting light at least at a given wavelength;
    means for detecting at least a portion of the light emitted by the probe tip;
    means for positioning the probe adjacent a sample such that the distance between the probe tip and the sample is smaller than about five times the given wavelength; and
    means for displacing the probe tip relative to the sample,
    CHARACTERIZED IN THAT
    the probe tip comprises fluorescent material capable of emitting light at least at the given wavelength when the fluorescent material is appropriately excited; and
    the apparatus further comprises means for exciting the fluorescent material.

2. Apparatus of claim 1, wherein:
    the probe comprises a glass pipette having a tapered end and an aperture in the tapered end; and
    the probe tip comprises a fluorescent body adherent to the pipette adjacent the aperture, the body comprising fluorescent material and having maximum lateral dimensions smaller than the given wavelength.

3. Apparatus of claim 1, wherein:

the probe comprises a glass pipette having a tapered end and an aperture in the tapered end, there being an inner diameter associated with the aperture; and the probe tip comprises a spheroidal body having a diameter greater than the aperture inner diameter, the body adherent to the pipette such that a first portion of the body lies within the aperture and a second portion of the body lies outside the aperture, at least the second portion of the body comprising fluorescent material, and the body diameter being smaller than the given wavelength.

4. Apparatus of claim 1, wherein:

the probe comprises a single-mode optical fiber having a tapered terminal portion and an end flat at the end of the tapered portion; and the probe tip comprises a fluorescent body adherent to the end flat, the body comprising fluorescent material and having maximum lateral dimensions smaller than the given wavelength.

5. Apparatus of claim 1, wherein:

the probe comprises a single-mode optical fiber having a tapered terminal portion and an end flat at the end of the tapered portion; and the probe tip comprises a spheroidal body having a diameter smaller than the given wavelength, the body adherent to the end flat, at least a portion of the body comprising fluorescent material.

6. Apparatus of claim 1, wherein:

the probe comprises a single-mode optical fiber having a tapered terminal portion (to be referred to as the "taper") and an end flat at the end of the tapered portion, the end flat having a diameter smaller than the given wavelength;

the probe tip coincides with a terminal portion of the taper, including the end flat; and the probe tip comprises implanted, fluorescent ions.

7. Apparatus of claim 1, wherein:

the probe comprises a single-mode optical fiber having a tapered terminal portion (to be referred to as the "taper") and an end flat at the end of the tapered portion, a borehole being defined in the end flat, a diameter being associated with the borehole; and the probe tip comprises a spheroidal body having a diameter greater than the borehole diameter, the body adherent to the fiber such that a first portion of the body lies within the borehole and a second portion of the body lies outside the borehole, at least the second portion of the body comprising fluorescent material, and the body diameter being smaller than the given wavelength.

8. Apparatus of claim 1, wherein the exciting means comprise a light source optically coupled to the fluorescent material.

9. Apparatus of claim 8, wherein the exciting means further comprise means for transmitting electromagnetic radiation from the light source, through the sample, to the fluorescent material.

10. Apparatus of claim 8, further comprising means for transmitting light emitted by the fluorescent material through the sample to the detecting means.

11. Method for manufacturing an article, comprising the steps of:

a) providing a multiplicity of semiconductor wafers, each wafer having a surface to be patterned by means of a patterning process;

b) setting at least one parameter of the patterning process;

c) processing at least a first wafer according to the process parameter, such that a pattern is formed on the surface of the wafer, the pattern having a characteristic dimension;

d) measuring the characteristic dimension in at least one of the multiplicity of semiconductor wafers;

e) comparing the characteristic dimension to a predetermined range of values;

f) if the characteristic dimension lies outside the predetermined range of values, changing the process parameter to bring the characteristic dimension within the predetermined range of values;

g) after (f), processing at least a second wafer according to the process parameter; and h) performing, on at least the second wafer, at least one additional step toward completion of the article,

CHARACTERIZED IN THAT the measuring step comprises:

i) providing a probe having a tip, the probe tip comprising fluorescent material capable of emitting light at least at a given wavelength when the fluorescent material is appropriately excited;

j) positioning the probe relative to the wafer such that the distance between the probe tip and at least a portion of the pattern is smaller than the given wavelength;

k) displacing the probe tip relative to the wafer;

l) during the displacing step, exciting fluorescence in the probe tip; and m) detecting fluorescent light emitted by the probe tip.

* * * * *